SIGNAL TRANSDUCER SYSTEMS

Filed Aug. 31, 1964 5 Sheets-Sheet 1

INVENTOR.

Marvin Camras

BY Hill, Sherman, Meroni, Gross & Simpson ATTORNEYS

INVENTOR.
Marvin Camras

BY Hill, Sherman, Meroni, Gross & Simpson ATTORNEYS

April 14, 1970 M. CAMRAS 3,506,780

SIGNAL TRANSDUCER SYSTEMS

Filed Aug. 31, 1964 5 Sheets-Sheet 3

INVENTOR.
Marvin Camras

BY Hill, Sherman, Meroni, Gross & Simpson ATTORNEYS

April 14, 1970 M. CAMRAS 3,506,780

SIGNAL TRANSDUCER SYSTEMS

Filed Aug. 31, 1964 5 Sheets-Sheet 4

INVENTOR.
Marvin Camras

BY Hill, Sherman, Meroni, Gross & Simpson ATTORNEYS

April 14, 1970 M. CAMRAS 3,506,780

SIGNAL TRANSDUCER SYSTEMS

Filed Aug. 31, 1964 5 Sheets-Sheet 5

INVENTOR.

Marvin Camras

BY Hill, Sherman, Meroni, Gross & Simpson ATTORNEYS

United States Patent Office 3,506,780

Patented Apr. 14, 1970

3,506,780

SIGNAL TRANSDUCER SYSTEMS

Marvin Camras, Glencoe, Ill., assignor to IIT Research Institute, Chicago, Ill., a corporation of Illinois Filed Aug. 31, 1964, Ser. No. 393,282

Int. Cl. H04n 5/78, 7/04, 5/62

U.S. Cl. 178—6.6 27 Claims

ABSTRACT OF THE DISCLOSURE

A television signal recording and playback system utilizing a recorder having a bandwidth substantially less than that of the broadcast television signal to be recorded. In one embodiment, the audio signal is changed from the 4.5 megahertz carrier directly to a carrier within the bandwidth of the recorder without intervening demodulation of the audio signal. In another embodiment, the audio is inserted during the horizontal blanking intervals of the recorded signal.

CROSS-REFERENCES TO RELATED APPLICATIONS

Reference is made under 35 U.S.C. 120 to my co-pending applications Ser. No. 344,075, filed Feb. 11, 1964 and Ser. No. 389,021 filed Aug. 12, 1964, now Patent No. 3,469,037.

This invention relates generally to a recording and playback system for audio and video intelligence received from a television receiver or the like, and specifically to a method for recording and playback wherein only one track per channel of the record medium is used.

In the past, recording of audio-video intelligence on a record medium required multi-track recording heads whereby audio intelligence is applied to one track of the recording channel while the video intelligence is applied to another track of a recording channel. This process of recording requires a relatively complex and costly transducer head system.

It is therefore an object of the present invention to provide a simplified and less expensive means for recording both audio and video intelligence on a record medium.

It is another object of the present invention to provide a novel and improved audio-video recording system whereby a simple one track recording head may be used for recording both the audio and the video signals from a television receiver or the like.

Another object of the present invention is to provide an improved recording and playback system which has equal or better reproducing characteristics as compared to a multiple track per channel system but which is substantially simpler and less expensive.

Still another object of the present invention is to provide a television recording and playback system in which the audio intelligence is applied to the record medium by means of a carrier of substantially reduced frequency as compared to the conventional audio carrier frequency.

A still further object of the present invention is to provide novel system wherein pulses, corresponding to audio intelligence, are applied to the blanking portion of the horizontal sweep component of a video signal obtained from a television receiver or the like to form a unitary signal which is a single valued function of time and which is particularly adapted for recording on a record medium or the like.

Further objects of this invention as well as a better understanding thereof may be had from the following description when considered in conjunction with the accompanying drawings, in which.

Figures 8, 9:
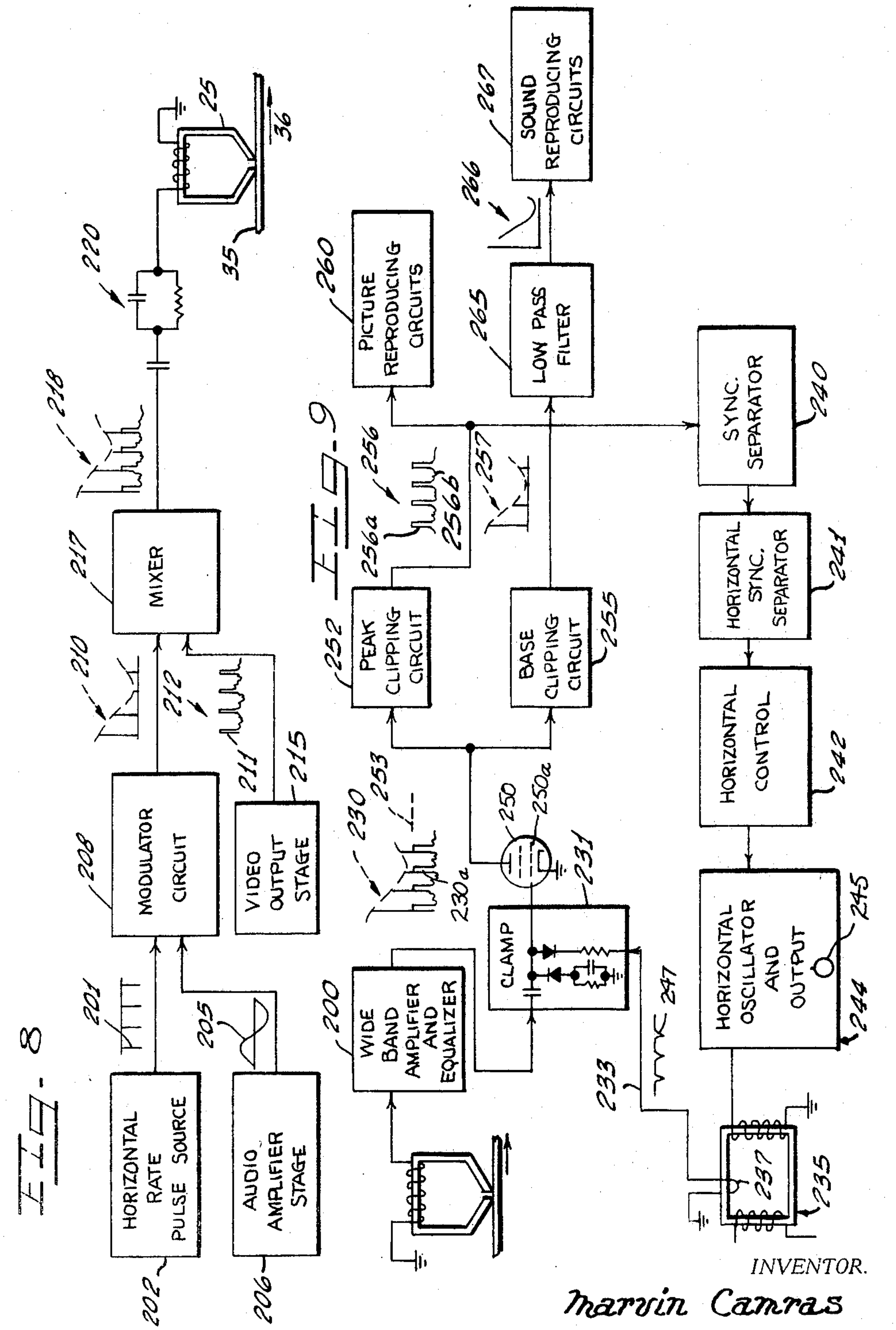
Figures 10, 11:
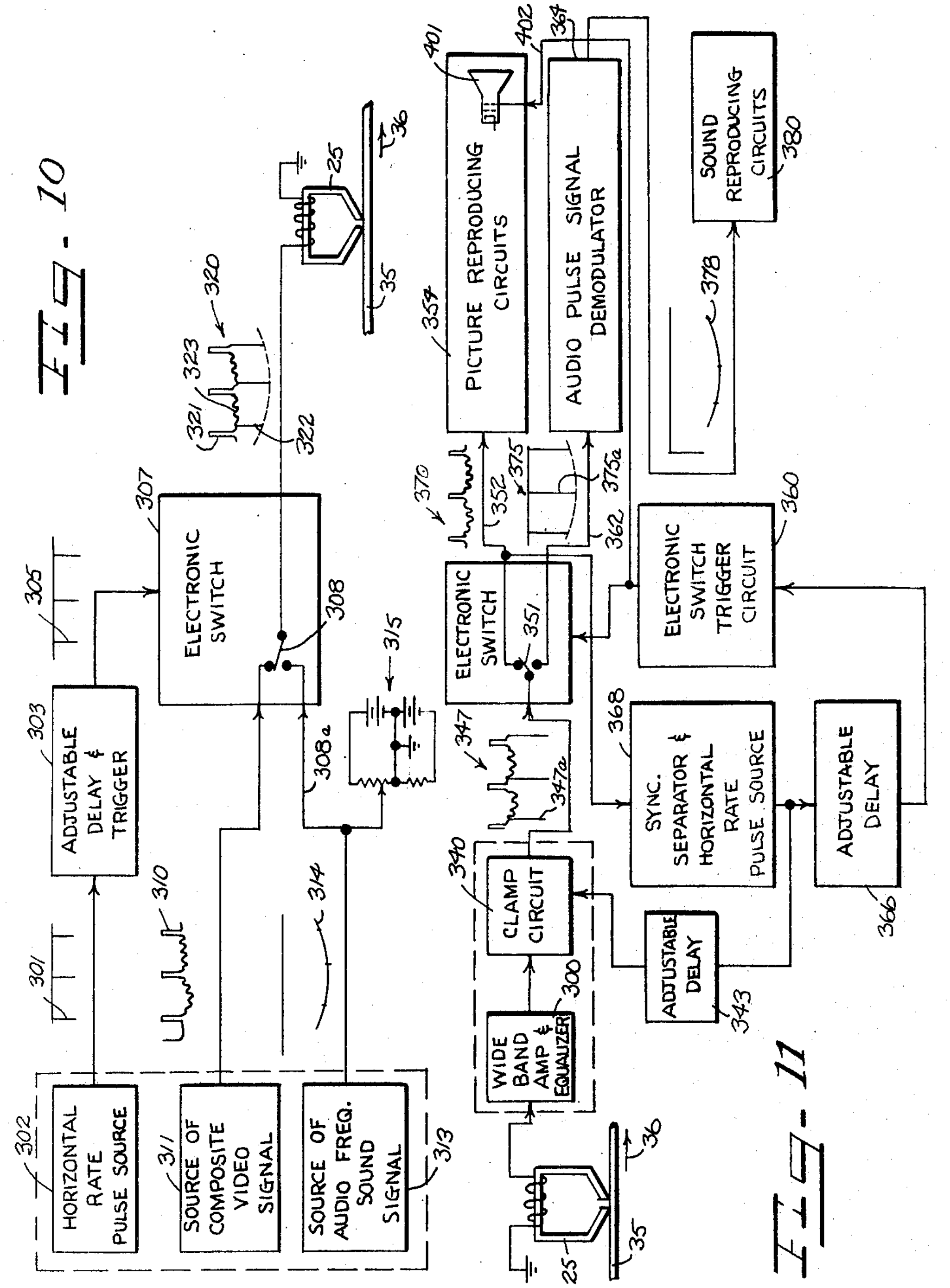

FIGURES 8 and 10 are diagrammatic illustrations of relatively simplified audio-video recording systems in accordance with the present invention; and FIGURES 9 and 11 are diagrammatic illustrations of suitable playback systems for the embodiments of FIGURES 8 and 10, respectively.

Figure 1:
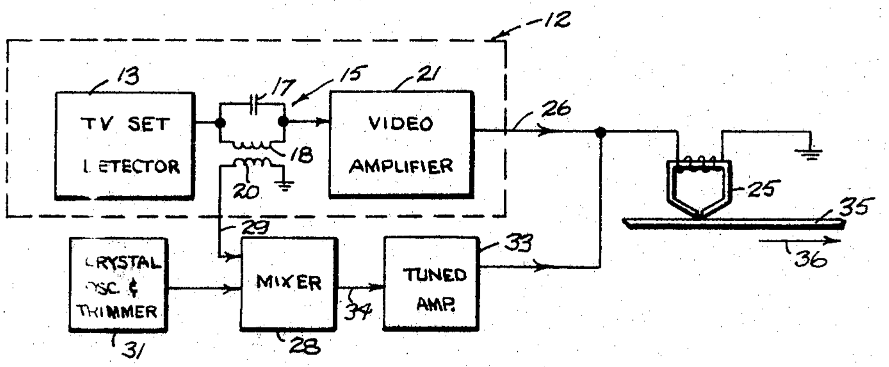
FIGURE 1 is a schematic block diagram of an audio-video recording system in which the audio intelligence is applied to a carrier of a frequency enabling mixing of the audio intelligence with the video intelligence and recording of the resultant signal on a single track of a magnetic record medium.

As shown on the drawings:

Shown in FIGURE 1 is an audio-video recording system which is designated generally by reference numeral 10. The combination audio-video intelligence signal which is to be recorded on a record medium is obtained from a commercially available television receiver 12. In the television receiver 12 a composite signal detector 13 has the output therefrom applied to a resonant tuned circuit 15, which comprises capacitor 17 and an inductor 18. The resonant circuit 15 is tuned to 4.5 megacycles, which is a standard intermediate carrier frequency for audio intelligence. Coupled to the resonant circuit 15 and in proximity with the inductor 18 is an inductor 20 constructed and arranged to receive by way of transformer coupling a portion of the 4.5 megacycle audio frequency carrier. Connected to the output of the resonant circuit 15 is a video amplifier 21 for amplifying the video intelligence and thereafter applying it to an electromagnetic transducer recording head 25 through the line 26.

As mentioned hereinabove, the 4.5 megacycle intermediate frequency audio carrier is coupled to the inductor 20. From there it is applied to a mixer circuit 28 through line 29. Also connected to mixer circuit 28 is an oscillator 31 having a frequency in the neighborhood of 6.5 megacycles per second, which can be of any convenient design to produce a substantially stable frequency signal.

The action of mixer 28 is to provide a carrier frequency representing the difference between the 6.5 megacycle oscillator signal and the intermediate frequency audio carrier. According to the preferred embodiment of the present invention the difference signal providing a carrier frequency in the neighborhood of two megacycles per second from the mixer circuit 28 is applied to a tuned amplifier 33 through line 34. The two megacycle audio carrier is then applied to the transducer head 25 together with video intelligence from line 26, thereby applying a composite audio-video signal to the record medium 35 which moves in the direction of arrow 36 at constant speed.

By way of example, the record medium 35 may have a width of ¼ inch and may provide a total of 10 channels. The composite audio-video track may occupy 20 mils for each channel allowing a 5 mil separation between channels. It is also noted in the preferred embodiment of the present invention that the two megacycle frequency of the audio carrier is nearly equal to the maximum frequency response of the record medium 35 in conjunction with the recording and playback transducer head assembly. Where the upper limit of frequency response of the record medium head system is higher than 2 megacycles per second, the frequency of the audio carrier may be increased if desired. A feature of the present invention resides in the recording of audio intelligence associated with a carrier having a frequency nearly equal to the maximum frequency response of the record medium-transducer head system.

Figure 1A:
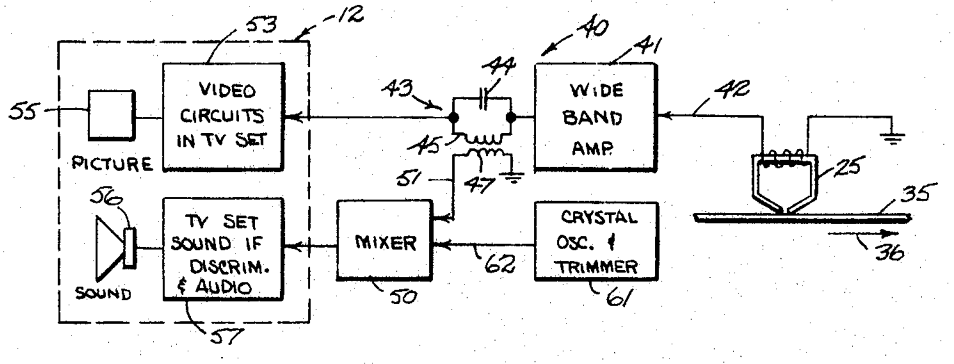
FIGURE 1A shows a playback circuit for the system of FIGURE 1.

A system for the playback of the signal recorded on the record medium 35 is shown in FIGURE 1A and is designated generally by reference numeral 40. During playback of the tape 35 the composite audio-video signal is applied to a wide band amplifier 41 through line 42. The composite signal after being amplified is then applied to a tuned circuit 43, which comprises capacitor 44 and inductor 45. An inductor 47 is inductively coupled to tuned circuit 43 by being in proximity with inductor 45. The nominally 2 megacycle intermediate frequency audio carrier which was recorded on the record medium 35 is thereby transformer coupled into inductor 47 from which the signal is applied to a mixer 50 through line 51. Connected to the output of tuned circuit 43 is the video circuits component 53, which is located in the television receiver 12, and to which the synchronizing signals and video signals are applied. In this manner, the video intelligence from the record medium 35 is amplified and separated from the composite audio-video signal and then applied to a picture tube 55 of the television receiver 12. However, the sound output of the television receiver 12 is obtained from a loud-speaker 55 which is connected to the television set sound discriminator and audio amplifier circuit 57 which, in turn, receives a 4.5 megacycle intermediate frequency audio carrier from mixer 50. Applied to mixer 50 is a 6.5 megacycle signal from the oscillator 61 through line 62. In this manner, the 2 megacycle intermediate frequency audio carrier reproduced from record medium 35 and the 6.5 megacycle signal from oscillator 61 are heterodyned to produce the original 4.5 megacycle intermediate frequency audio carrier.

Although the recording system of FIGURE 1 has little or no response to signal components above two megacycles, the amplifier 21 may be provided with filtering means to remove components above two megacycles prior to mixing of the video signal with the audio signal from mixer circuit 28.

Figure 2:
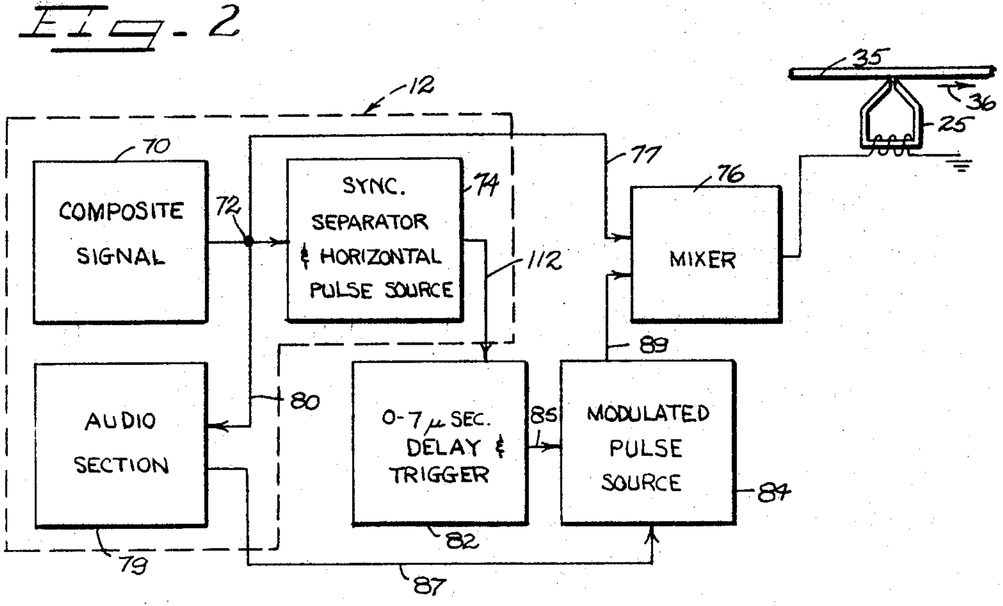
FIGURE 2 is a schematic block diagram of an audio-video recording system in which audio intelligence is applied to the blanking portions of a composite video signal.

An alternate method for recording the sound and the video intelligence on a single track of a record medium is shown in FIGURE 2. The recording of sound intelligence is accomplished by modulation of the waveform in the blanking portion of the composite video signal. In commercially available television receivers the horizontal synchronizing and blanking waveform lends itself readily to various types of pulse modulation, such as pulse-height modulation, pulse-width modulation, and pulse-phase modulation. A simplified block diagram of one of the preferred methods of applying audio intelligence pulses to the blanking portions of a video signal is shown in FIGURE 2.

The composite audio-video intelligence signal received from the composite signal amplifier 70 (or the detector) of the television receiver 12 is applied to a common tie point 72 for distribution to various stages of the recording system. From the tie point 72 synchronizing signals are applied to the synchronizing signal separator 74. Also from the tie point 72 the composite signal is applied to a mixer circuit 76 through line 77. The intermediate frequency audio carrier is applied to the audio section 79 through line 80 from tie point 72.

To obtain the audio modulated pulses on the record medium, horizontal rate pulses from the sync. separator and horizontal pulse source 74 are applied to a delay and triggering circuit 82, which by way of example may provide an adjustable delay of between zero and seven microseconds. The delayed pulses from the delay and triggering circuit 82 are then applied to a multivibrator circuit 84 through line 85. In the illustrated embodiment, the multivibrator 84 is of the monostable type; however, it is not to be construed as a limiting factor in the construction of the recording system. For example an astable multivibrator could be used synchronized by the trigger circuit 82 and provided with a clipping circuit to pass only pulses of the desired polarity.

Modulation of the microsecond duration pulses from multivibrator 84 is accomplished by applying for example to the plate supply circuit of the multivibrator a modulating voltage which varies in amplitude in response to varying audio signals received from the audio section 79 in the television receiver 12. In this manner, audio intelligence pulses are generated by a combination of horizontal rate pulses and audio signals from the television receiver 12. For example the amplitude of the pulses from multivibrator 84 may be modulated by means of the modulating voltage supplied to the multivibrator via line 87. In this case the width of the pulses from multivibrator 84 may correspond to one-half the width of the horizontal sync. pulses of the video signal.

The duration of the horizontal blanking intervals is of the order of ten microseconds. The audio intelligence pulses from multivibrator 84 occur during the blanking interval and may coincide in time with the occurrence of the horizontal sync. pulses in which case the delay would be omitted. In this manner, video intelligence applied to the mixer circuit 76 through line 77 and audio intelligence pulses applied to the mixer circuit 76 through line 89 are combined to form an audio-video composite signal which, in turn, is applied to the record medium 35 through electromagnetic transducer head 25.

Figures 4, 4A, 4B, 5, 6:
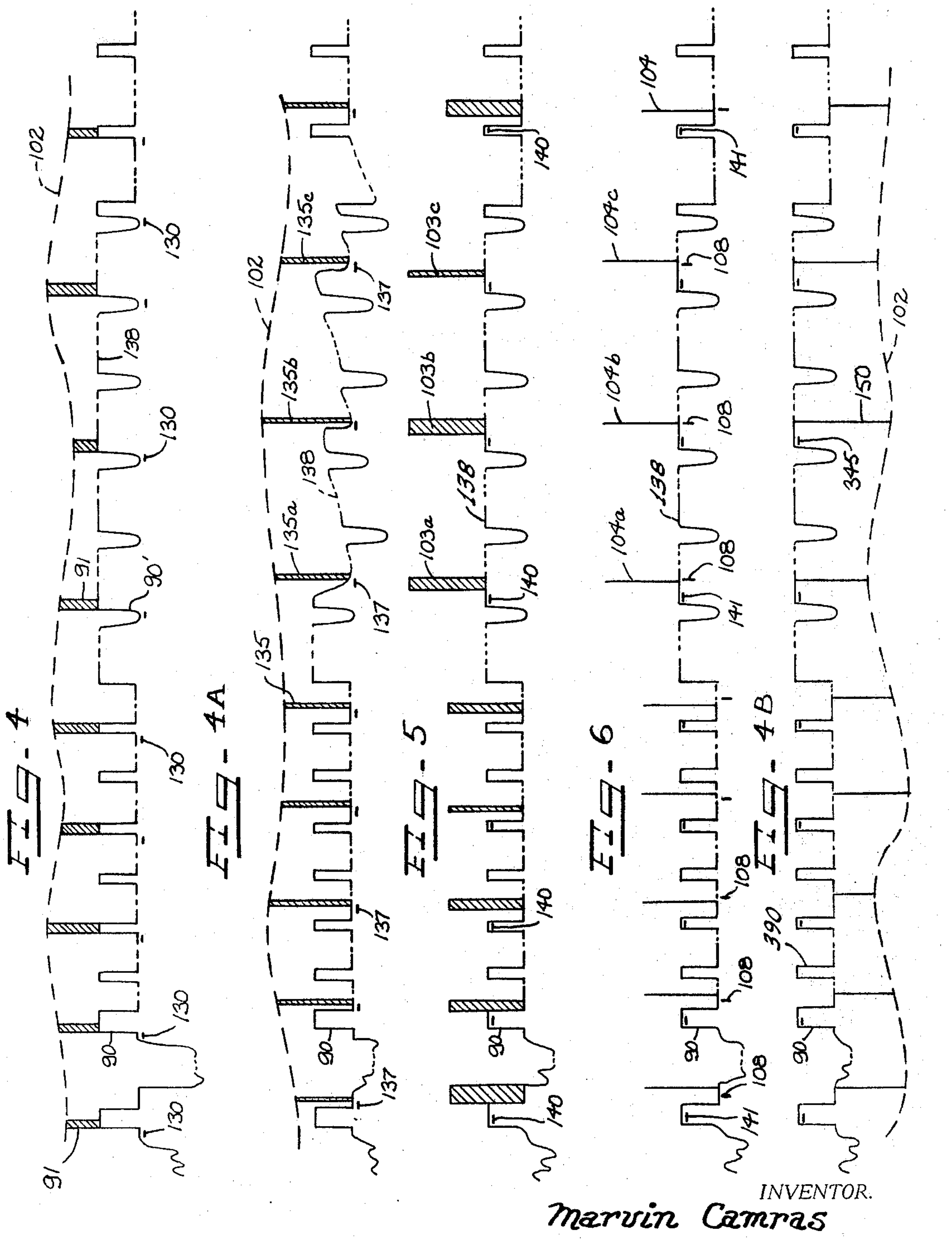
FIGURES 4, 4A and 4B are waveform diagrams showing the audio intelligence applied to the blanking portion of a composite video signal as pulse height modulation.
FIGURE 5 is a waveform diagram showing the audio intelligence applied to the blanking portion of a composite video signal as pulse width modulation.
FIGURE 6 is still another waveform diagram showing the audio intelligence applied to the blanking portion of a video signal as pulse phase modulation.

In the embodiment of FIGURE 4, the amplitude of the pulses from multivibrator 84 is modulated. The pulses occur during the horizontal blanking interval at the time at which the horizontal synchronizing pulses occur as indicated at 90 in FIGURE 4. During the time of a maximum positive amplitude of audio intelligence from the television receiver 12 the amplitude of the microsecond duration pulses from multivibrator 84 may still be small enough in comparison to the amplitude of the synchronizing pulses so that the audio pulses do not interfere with the normal synchronizing action. Since the repetition rate of the audio intelligence pulses which are indicated at 91 in FIGURE 4 is greater than the maximum frequency response of the audio systems in most television receivers, very clear and faithful reproduction is accomplished by applying audio intelligence at a line scanning rate, which is 15,750 cycles per second.

Figure 3:
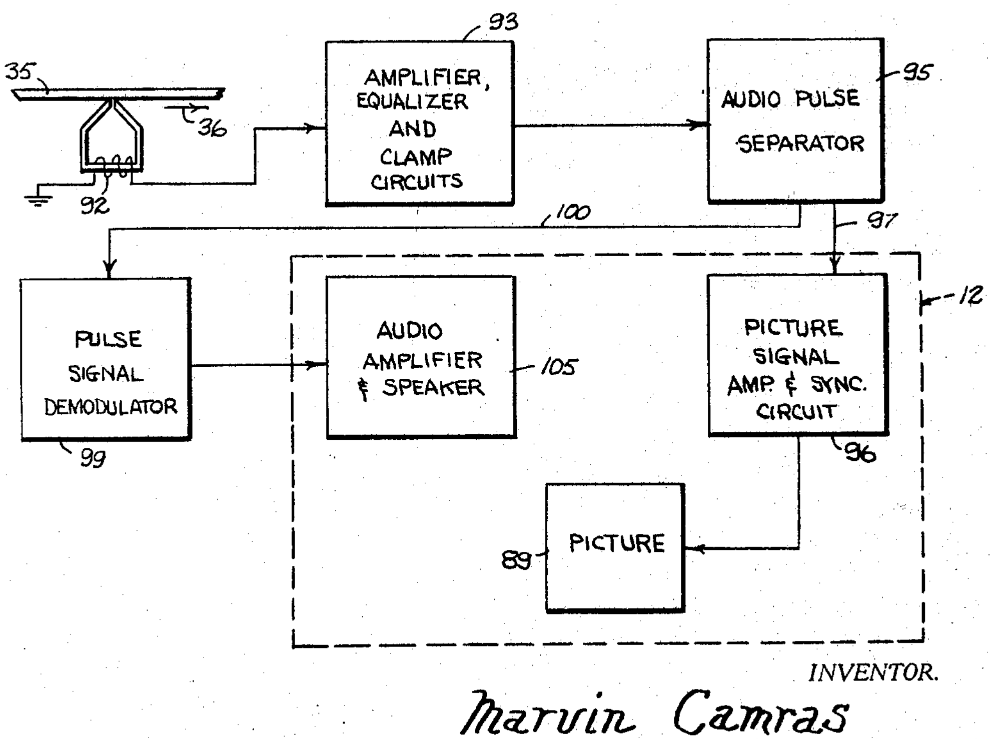
FIGURE 3 is a schematic block diagram of an audio-video playback system for the embodiment of FIGURE 2.

Shown in FIGURE 3 is a block diagram of an arrangement for playback of the composite audio-video signal. The record medium 35 is passed over the electromagnetic transducer head 25 thereby producing a varying flux field linking the coil 92, located on the transducer head 25. The induced voltage from coil 92 is applied to the amplifier, equalizer and clamp circuits component 93.

From the output of the amplifier and equalizer circuit 93 the composite signal is applied to audio pulse separator circuit 95. The non-audio part of the signal is transmitted via line 97 to a picture signal amplifier and synchronizing circuits component 96 in the television receiver 12. The picture signal amplifier and synchronizing component 96 will then produce a picture on the picture tube 98 of the television receiver 12.

The audio intelligence pulses 91, FIGURE 4, are removed from the blanking portion of the horizontal scanning signal by the audio pulse separator circuit 95 and are then applied to a pulse signal demodulator circuit 99 through line 100. This circuit may perform essentially a filtering or integrating function. After the audio intelligence pulses have been subjected to the appropriate filtering or integrating circuits to produce an audio signal as represented by dotted line 102, FIGURE 4, the audio intelligence is applied to the audio amplifier and speaker component 105 of the television receiver 12.

FIGURE 5 illustrates the case where the duration of the pulses from multivibrator 84 is varied in proportion to the amplitude of the audio intelligence applied thereto. This can be accomplished by basically the same circuitry as shown in FIGURE 2 with the modification that the audio modulating signal applied to multivibrator 84 through line 87 is applied for example to the grid circuit of the multivibrator 84 in order to obtain varying pulse width signals therefrom. The triggering circuit 82 preferably provides a delay of the order of six microseconds so that the audio pulses 103 occur after the trailing edge of the synchronizing pulses 90. During playback of the pulse width modulated signal shown in FIGURE 5, the system shown in FIGURE 3 can substantially remain the same with the only modification required being in the pulse signal demodulator circuit 99.

A still further modification is shown in FIGURE 6. The audio intelligence pulses 104 of FIGURE 6 are frequency or phase modulated about a central position (in time) indicated by vertical marks 108. Although the method of frequency or phase modulation is more complex than the amplitude or pulse width modulation as mentioned hereinabove, it has advantages which may compensate for the complexity of the circuitry required. By using frequency or phase modulation, essentially noise-free audio reception is obtainable. By way of example, about five microseconds of the blanking intervals are used for the horizontal synchronizing pulses 90 leaving approximately 3 microseconds for the application of frequency or phase modulated pulses. Thus the pulses 104 can vary 1½ microseconds on either side of the central position 108. The circuit 82 thus may provide a delay of about 5 microseconds in this circumstance.

Figure 7:
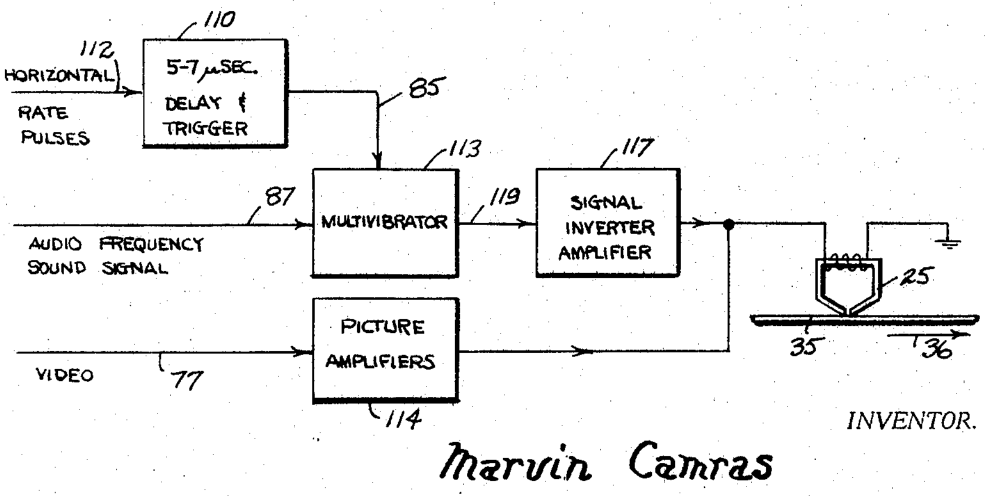
FIGURE 7 is a block diagram of a synchronizing and gating system by which the audio intelligence pulses of inverted polarity are applied to the blanking portion of a video signal.

A still further alternative of the present invention is shown in FIGURE 7 wherein negative pulses are applied to the blanking portion of the horizontal scanning signal just after the occurrence of the horizontal sync. pulse 90 (see FIG. 4B). In using this system, however, there is a practical limit to the width and height of the negative pulses. If the pulse width is too great it may interfere with the effectiveness of the blanking portion of the horizontal signal. Horizontal rate pulses which are obtained as indicated in FIGURE 2 are applied to a 5 to 7 microsecond delay and trigger circuit 110 through line 112 thereby ensuring that a blanking pulse of at least 7 to 9 microseconds will appear prior to the audio signal. The audio modulating signal is applied via line 87 as in FIGURE 2 to a multivibrator circuit 113. The video signal is applied to the video amplifier component 114 through a line 77 corresponding to line 77 in FIGURE 2. The audio intelligence pulses from the multivibrator 113 which are of the same polarity as the horizontal synchronizing pulses may be moduated in any one of the methods mentioned hereinabove. To obtain negative polarity audio pulses the audio pulses are applied via line 119 to signal inverting amplifier circuit 117 which has an inverted output. The blanking pulses from picture amplifiers component 114 will be of positive polarity, so that the audio pulses will have a net positive amplitude after adding of the two signals below the blanking (black) level. The composite audio-video signal from amplifier 117 and video amplifier 114 is then applied to the electromagnetic transducer 25.

Referring to the embodiment of FIGURES 1 and 1A, the sound carrier frequency supplied by the mixer 28 is preferably an odd multiple of 7,875 cycles per second and is preferably also an odd multiple of 15 cycles per second. Multiplying 7,875 by 15 gives a product of 118,125. If this product is multiplied by 15, the result is 1,771,875, which frequency would be a suitable sound carrier. In order to generate this carrier from the mixer 28, the crystal oscillator and trimmer component 31 would be adjusted to provide a frequency of 6,271,875 cycles per second. Alternatively, if the product is multiplied by 17, for example, a sound carrier of 2,008,125 cycles per second is obtained. This sound carrier would be generated if the crystal oscillator and trimmer component 31 were operated at a frequency of 6,508,125 cycles per second. It may be assumed that the record medium 35 together with the head 25 provides a response which would include the sound carrier such as 2,008,125 cycles per second as well as a suitable upper side band associated with the audio modulation. The trimmer adjustment associated with crystal oscillator 31 may be adjusted so as to provide the precise frequency which affords a minimum interference between the audio frequency modulation signal supplied by mixer 28 and the video signal from amplifier 21.

The tuned circuit 15, of course, may substantially attenuate the level of the audio signal transmitted to the video amplifier 21. A circuit such as indicated at 15 is found, for example, in the Zenith television set chassis 14L30. In the particular set referred to above, the video amplifier 21 precedes the tuned network 15, in which case, of course, the video amplifier 21 would have a pass band including the sound carrier frequency of 4.5 megacycles per second.

The tuned amplifier 33 would, of course, be tuned to the output frequency of the sound barrier from mixer 28 and would have a sufficiently wide pass band to pass the upper and lower side bands of the sound intelligence signal.

Referring to FIGURE 1A, the crystal oscillator and trimmer component 61 may be operated exactly as described with reference to the component 31 in FIGURE 1, the trimmer of the oscillator 61 being utilized for best reproduction of the sound from the record medium. The wide band amplifier 41 may correspond to the arrangement shown in the seventh figure of my copending application Ser. No. 389,021 filed Aug. 12, 1964 now Patent No. 3,469,037 and entitled "Magnetic Transducer Head." The disclosure of said copending application is incorporated herein by reference in its entirety. The video recording section of the head of said copending application may, of course, advantageously be employed in place of the head 25 shown in the drawings of the present case. The tape transport and other features of the transducer head are applicable to the system of the present invention. These remarks apply to each of the embodiments hereof. Thus, the circuit components 93 of FIGURE 3, 200 of FIGURE 9 and 300 of FIGURE 11 may correspond to the circuit shown in the seventh figure of said copending application.

With reference to the embodiment of FIGURE 2, the waveform of the composite audio-video signal has been indicated in FIGURE 4 for the case of pulse amplitude modulation coinciding with the horizontal synchronizing pulses of the video waveform. During the vertical synchronizing pulse interval, the audio pulses 91 are offset from the serrations such as indicated at 90′ as indicated in FIGURE 4. In playing back a waveform such as indicated in FIGURE 4, the audio pulse separator component 95 of FIGURE 3 may comprise a first clipping circuit for transmitting only the audio pulses 91 and a second clipping circuit for transmitting only the standard video waveform below the level of the synchronizing pulses 90. By way of example, during playback, the component 93 may clamp the reproduced waveform at the regions thereof corresponding to the "front porch" of the horizontal blanking pulses and as indicated by the horizontal marks 130 in FIGURE 4. Where the waveform of FIGURE 4 is reproduced, the delay and trigger circuit 82 may provide essentially a zero time delay so that the multivibrator 84 is triggered at the leading edge of the horizontal sync. pulses 90.

Where amplitude modulated pulses such as indicated at 135 in FIGURE 4A are to be recorded, which occur after the trailing edge of the horizontal synchronizing pulses 90, the delay and trigger circuit 82 may introduce a time delay of the order of 7 microseconds with respect to the leading edge of the horizontal synchronizing pulses 90. During playback, the component 93 may clamp the reproduced waveform at the portions thereof indicated at 137 in FIGURE 4A immediately following the trailing edge of the horizontal synchronizing pulses 90.

This clamping distorts the vertical sync. pulse waveform indicated at 138 to some extent as indicated in FIGURE 4A so that the pulses 135 are referenced at least approximately to a common base level. Alternatively, the clamping may be omitted, in which case the vertical synchronizing pulses will distort the amplitude of audio pulses such as indicated at 135*a*, 135*b* and 135*c* producing a certain hum during playback. This degree of hum could be tolerated or filtered if desired. For reproducing the waveform of FIGURE 4A, the audio pulse separator component 95 could again comprise a clipping circuit for transmitting the portions of the audio pulses 135, 135*a*, 135*b*, 135*c* above a level corresponding to the level of the synchronizing pulses 90. The video portion of the signal if transmitted by a peak clipping circuit would include the lower portions of the audio pulses 135. Alternatively, the audio pulse separator 95 may comprise an electronic switch of the single pole double throw type which is synchronized to connect with line 100 momentarily at the time of occurrence of the pulses 135, the switch otherwise being connected with the line 97. The electronic switch could be controlled by means of components such as indicated at 74 and 82 in FIGURE 2, for example.

As indicated in FIGURE 5, the amplitude of the width modulated pulses 103 will vary because of the vertical synchronizing pulse 135. This variation can be eliminated by clipping the peaks of the pulses 103*a* and 103*b* and 103*c* having the greater amplitude. The audio pulse separator 95 may include a base clipping circuit for transmitting the remainder of the pulse width modulated pulses via line 100, a peak clipping circuit being utilized to transmit the video portion of the signal to line 97. The width modulated pulses may be demodulated by component 99 which in this case may comprise a simple integrator circuit. As previously, the peak clipping circuit for eliminating the amplitude modulation of the pulses 103 may be omitted and the resultant hum tolerated or filtered.

Referring to FIGURE 6, the position modulated pulses 104 may also be amplitude modulated in the region of the vertical sync. pulse 138, and such amplitude modulation may be eliminated by peak clipping or tolerated as in the embodiment of FIGURE 5. The audio pulse separator 95 may include a base clipping circuit for transmitting the pulses 104 to the line 100 as in the embodiment of FIGURE 5. Alternatively, the pulse separator 95 may comprise a single pole double throw switch which is connected to the line 100 during the time interval of the back porch of the horizontal blanking pulses, the switch output being otherwise connected with the line 97 as in the embodiment of FIGURE 5. The pulse signal demodulator component 99 may serve to demodulate the audio pulses 104 by converting the same to pulse width modulated signal, for example, and then integrating. For example, a bistable multivibrator could be placed in a set condition by means of pulses occurring at the horizontal sync. rate and in phase with the sync. pulses 90, the bistable multivibrator being reset by the following pulse 104. The output of the bistable multivibrator would then be a pulse width modulated wave which could be demodulated by an integrating circuit, for example. The waveforms of FIGURES 5 and 6 may be clamped by the component 93 at the intervals indicated by horizontal marks 140 and 141 in FIGURES 5 and 6, respectively.

FIGURE 4B illustrates amplitude modulated pulses 150 of negative polarity such as might be produced at the output of amplifier 117, FIGURE 7. As in the embodiment of FIGURE 4A, if clamping is not applied as indicated at 137 in FIGURE 4A, there will be a hum introduced by the vertical sync. pulse waveform portion 138. This hum may be tolerated or filtered as described in connection with the previous embodiments. Playback of the waveform recorded by the embodiment of FIGURE 7 would be by means essentially similar to that illustrated in FIGURE 3. The audio pulse separator component 95, however, could not rely on a clipping action. A single pole double throw electronic switch could, however, be utilized for the component 95 of FIGURE 3 as described in connection with FIGURES 5 and 6, for example. The negative polarity audio pulses 150 may, of course, be width or position or phase modulated as illustrated in FIGURES 5 and 6 for the case of positive polarity pulses. The width or phase modulated pulses could be separated by means of an electronic switch as has been described in connection with FIGURES 5 and 6. Demodulation could also be as described in connection with FIGURES 5 and 6.

FIGURE 8 illustrates a simplified recording system. In this system, pulses 201 which occur at the horizontal line frequency rate are obtained from any suitable point in a conventional television receiver as represented by the horizontal rate pulse source component 202. By way of example, the pulses 201 can be obtained by means of a single turn winding on the horizontal flyback transformer of the conventional television set. The audio frequency sound waveform as indicated at 205 is obtained from a suitable audio amplifier stage 206 of the conventional television receiver. The pulse waveform 201 may be amplitude modulated in accordance with the audio waveform 205 by means of an amplitude modulator circuit component indicated at 208. The output waveform is then as indicated at 210 with the pulses of the waveform 210 occurring in time coincidence with the leading edges of the horizontal sync. pulses 211 of the video intelligence waveform indicated at 212 which is obtained from a suitable video stage of the conventional television set as indicated by component 215 in FIGURE 8. The waveforms 210 and 212 are combined in a mixer component 217 to provide a composite waveform as indicated at 218 in FIGURE 8. This composite waveform is shown as being supplied via an equalizing circuit 220 to the recording head 25 for recording on the record medium 35 which moves, for example at constant speed, in the direction of the arrow 36. Any suitable form of bias may be supplied during the recording process, such as direct current bias or high frequency bias as described in the aforementioned copending application.

By way of example, suitable electrical amplitude modulation circuits are illustrated in chapter 11 of the book Waveforms by Chance (volume 19 of the Radiation Laboratory Series, 1949).

During the playback operation as illustrated in FIGURE 9, the composite signal is transmitted by means of a wide band amplifier 200 previously referred to and which may include provisions for equalization of the reproduced signal, for example as disclosed in the seventh figure of the aforementioned copending application.

If it is desired to clamp the reproduced waveform as indicated at 230 in FIGURE 9 at one of the points such as indicated in FIGURE 4 or FIGURE 4A, that is at the front porch or the back porch of the horizontal blanking waveforms, a suitable clamping circuit such as indicated at 231 may be provided. The clamping circuit 231 is activated at the desired clamping interval as represented by dash line 130 in FIGURE 4 or dash line 137 in FIGURE 4A by means of a line 233. The line 233 may be energized at the horizontal line rate through a suitable delay so that the line 233 is activated at a predetermined time after the occurrence of the leading edge of the sync. pulses 90. By way of specific example only, the horizontal rate pulses in each of the embodiments illustrated herein may be derived from the horizontal flyback transformer 235. The line 233 is actually shown connected to a single turn 237 on the transformer 235. The transformer 235 is illustrated as being energized by the conventional components of a television set including the sync. separator component 240, the horizontal sync. separator 241, the horizontal control 242 and the horizontal oscillator and output component 244. It is found that the horizontal hold control operating adjustment diagrammatically indicated at 245 in FIGURE 9 provides a sufficient timing adjustment of the horizontal rate pulses 247 supplied to line 233 relative to the leading edge 230*a* of the sync. pulses of waveform 230.

In the illustrated example, the output from the clamp circuit 231 is inverted by means of a direct coupled wide band amplifier component 250 after which the pulse modulation may be removed from the waveform 230 by means of a peak clipping circuit 252 which clips the portions of the waveform 230 above the amplitude level indicated at 253. Similarly the audio intelligence pulses may be removed from the waveform 230 by means of a base clipping circuit 255 which transmits only those portions of the waveform 230 having an amplitude above the level indicated at 253. The peak clipping circuit 252 thus delivers a waveform such as indicated at 256 while the base clipping circuit 255 provides a waveform such as indicated at 257. The horizontal sync. pulses as indicated at 256*a* may be removed by means of the horizontal sync. separator component 240 and utilized to control the horizontal deflection circuits of the television set. The picture portion of the waveform such as indicated at 256*b* is supplied to the picture reproducing circuits component 260 for producing the desired visual image. In a typical television receiver, the vertical scanning signal may be obtained from the sync. separator component 240 and transmitted to the vertical oscillator and output stages. The interconnections not shown in FIGURE 9 are of a conventional nature.

The audio waveform indicated at 257 may be demodulated by means of a suitable low pass filter component indicated at 265. A conventional audio detector may be utilized if necessary. The audio frequency sound waveform from the filter component 265 is indicated at 266 and is supplied to conventional sound reproducing circuits as indicated at 267 of a conventional television receiving set.

FIGURE 10 illustrates a further simplified recording system in accordance with the present invention. In this system horizontal rate pulses 301 are supplied from a horizontal rate pulse source component 302. The pulses 301 are adjustably delayed by means of component 303 to provide a delayed pulse waveform as indicated at 305. The component 303 may be provided with suitable wave shaping means so as to provide a suitable actuating signal for electronic switch component 307. For diagrammatic purposes, the electronic switch has been illustrated as comprising a single pole double throw switch element 308 which is normally in its upper position but is momentarily actuated to its lower position at the time of the delayed pulses 305.

The upper terminal of switch 308 is supplied with a composite video waveform as indicated at 310 from a source of composite video signals indicated at 311. The lower terminal of the switch is connected to a source of audio frequency sound signal component 313 which supplies an audio waveform as indicated at 314. A suitable bias source 315 is provided for adjustably determining the level of the audio signal 314. The resultant waveform delivered from the electronic switch 307 is as indicated at 320 and this waveform is supplied to the recording head 25 as in the previous embodiment. Where the delay component 303 provides a delay of the order of five to seven microseconds from the leading edge of the synchronizing pulses 321, the audio pulses as indicated at 322 will occur during the time interval of the "back porch" of the horizontal blanking pulse waveform as indicated in FIGURE 4B. Preferably, the delay provided by component 303 is such that the audio pulses 322 occur after the trailing edge of the sync. pulses 321 as is illustrated in the waveform 320 (appearing to the right of component 307 in FIG. 10).

In any of the embodiments, the audio pulses may extend into the picture signal portion (indicated at 323, FIG. 10). To insure that negative pulse intelligence such as illustrated at 150 in FIGURE 4B is not visible in the reproduced picture, the picture tube of the television set may be cut off by pulses from the horizontal oscillator circuit once the horizontal oscillator circuit has been triggered by an input horizontal sync. pulse. Thus, the cathode ray beam of the television tube will be at a black level even though the video signal portion has an amplitude corresponding to a "white" intensity of the cathode ray beam. An additional picture tube grid, or a gate circuit may be used to produce such cut off of the cathode ray beam for a short interval following the occurrence of the horizontal sync. pulses. The cut off pulses from the horizontal oscillator circuit which are supplied to such additional picture tube grid or gate circuit may be generated by means of a winding such as indicated at 237 in FIGURE 9.

Whenever there is a possibility that audio pulses may extend into the picture signal portion, the audio may be made invisible by cutting off the edge of the reproduced picture by expanding the picture width beyond its "frame," that is beyond the portion of the end face of the cathode ray tube which is visible to the viewer. Also the time during which the picture is blanked out may be increased by the use of a wider than normal cut off pulse to the picture control grid at the horizontal rate.

In embodiments utilizing an electronic switch such as illustrated in FIGURE 10, the switch may dwell on the audio input line such as 308*a* in FIGURE 10 for four microseconds, at a repetition rate of 63.5 microseconds, in which case the audio intelligence may be fitted within the horizontal blanking interval. If a longer dwell is desired, as for example ten microseconds to give a better audio signal-to-noise ratio; or if the audio pulse interval is otherwise arranged to extend outside the normal blanking interval then the added width of cut off pulse to the picture control grid at the horizontal rate, or the use of an additional picture tube grid or gate circuit as previously described, is desirable. During playback as illustrated in FIGURE 11, for example, the time of dwell on the audio output line 362 is preferably somewhat shorter than the dwell of switch contact 308 on audio input line 308*a* in FIGURE 10 during recording. The narrower gating interval during playback allows for errors in timing without transmission of the video signal to the audio circuit such as component 364 in FIGURE 11.

Electronic switching such as illustrated in FIGURES 10 and 11 can be used with various types of modulation for the audio intelligence, but electronic switching is particularly useful where the amplitude of the audio intelligence is less than the amplitude of the synchonizing pulses. Electronic switches are conventional as illustrated in chapter 10 of the aforementioned book by Chance et al. entitled Waveforms. To provide a double pole switch, two switch circuits may be utilized one of which is closed in response to the pulses such as 305 in FIGURE 10 and the other of which is opened in response to the pulses 305.

In the playback system of FIGURE 11, the signal recorded by the system of FIGURE 10 is supplied to wide band amplifier component 300 and then to clamp circuit 340. The clamp circuit 340 may be operated to clamp the wave form by means of a circuit such as illustrated at 231, 233, 237 in FIGURE 9. Clamping may be adjusted by means of the adjustable delay component 343 so as to take place in the time interval immediately following the leading edge of the synchronizing pulses 90, for example as indicated by the horizontal marks 141 in FIGURE 6 or 345 in FIGURE 4B. The waveform supplied from the clamping circuit 340 may be as indicated at 347 in FIGURE 11 and is supplied to an electronic switch component 350. The electronic switch component has been diagrammatically indicated as comprising a mechanically movable contact 351 which normally completes an upper circuit 352 leading to the picture reproducing circuits component 354. The electronic switch component is actuated by an electronic switch trigger circuit 360 so as to shift the switch to complete a lower line 362 leading to an audio pulse signal demodulator component 364 during the intervals of the occurrence of audio pulses such as indicated at **347*a* in the waveform 347. The trigger circuit 360 may be actuated from an adjustable delay component 366 which in turn is supplied with a horizontal rate pulse waveform from a component 368. The component 368 includes a sync. separator of conventional design for receiving the waveform 370 from the picture reproducing circuit component 354 and for converting the horizontal sync. pulses thereof into horizontal rate pulses for operating the clamp circuit 340 and the trigger circuit 360. In the illustrated embodiment, the delay component 366 would provide a delay of from 6 to 8 microseconds in conformity with the time of occurrence of the pulses indicated at 150 in FIGURE 4B. The switch component 350 would, of course, be actuated to complete the circuit 362 for a time interval beginning in advance of the occurrence of the pulse 150 and continuing for a time slightly greater than the duration of the pulses 150 of FIGURE 4B. The audio waveform supplied by line 362 is indicated at 375 as a series of pulses corresponding to the pulses 342*a* whose amplitude is modulated in accordance with the sound to be reproduced. The output of the demodulator component 364 is then the audio frequency sound waveform as indicated at 378 which is supplied to the sound reproducing circuits component 380** of the conventional television set.

Where the adjustable delay 343 is to provide for a clamping action at the peak of the synchronizing pulses 90 and at the peak of the equalizing pulses such as indicated at 390 in FIGURE 4B, the delay 343 may introduce a delay of the order of one microsecond since the equalizing pulses have a duration of the order of 2½ microseconds.

The embodiment of FIGURES 10 and 11 may be operated with width modulation or phase modulation instead of amplitude modulation, and the delay components 303 and 366 would be operated to provide audio transmission intervals corresponding to the maximum range of modulation to be transmitted. As previously described, the modulation may extend slightly into the picture portions of the waveform as indicated at 323 in FIGURE 10 since this corresponds to an edge of the reproduced visual image which may be blanked out during the picture visual reproduction process.

In the recording of waveforms such as indicated in FIGURE 4 by means of the system of FIGURE 2, there is a cumulative delay in many of the sync. circuits of a television set, so that the horizontal pulse output from source 74 might excessively lag the horizontal sync. pulses such as indicated at 90 in FIGURE 4 even with the delay component 82 providing a zero time delay. In some cases, therefore, it may be necessary to advance the phase of the sync. circuits of the television set in order to provide a recorded waveform such as indicated in FIGURE 4.

Where the component 84 represents a free running multivibrator having a symmetrical rectangular waveform output, it is necessary to provide a pulse forming circuit so as to provide resultant pulses such as indicated at 91 in FIGURE 4. For example, a differentiating circuit followed by a rectifier may be utilized to provide a series of output pulses of desired polarity. Where the plate voltage of the free running multivibrator is modulated by the audio signal, the output pulses will be modulated in amplitude.

Referring to FIGURE 3, the audio pulse separator 95 for the waveform of FIGURE 4 may include a diode clipper, or a sharp-cut off amplifier biased to respond only to the modulated portion 91 superimposed on the sync. pulses 90. The signal sent via line 97 to the picture signal circuits component 96 need not in many cases have the audio modulation removed since the picture circuits are not sensitive to this modulation.

Referring to the waveform of FIGURE 4A, the clamping action may not depress the amplitude of the vertical sync. waveform 138 as fully as indicated, and the rise in amplitude between clamping intervals may not be so great as illustrated in FIGURE 4A. An electronic switch if utilized for the generation of a waveform similar to FIGURE 4A prevents the offset of the waveform as illustrated in FIGURE 5 at **103*a*–103*c*** during the vertical sync. pulse interval.

Referring to FIGURE 5, a limiter for limiting the amplitude of the pulses **103, 103*a*–103*c* may be provided at the input to the pulse signal demodulator component 99** so as to prevent distortion due to variation in pulse height.

Referring to FIGURE 8, the modulator circuit component 208 may comprise a pentode amplifier wherein the pulses 201 are supplied to the first control grid of the pentode tube and the audio waveform 205 is supplied to the screen grid of the pentode tube.

Referring to FIGURE 9, the clamping circuit 231 includes a capacitor **231*a* and a resistor 231*b* having relatively large values so that the capacitor 231*a* tends to maintain a substantially fixed negative voltage. Each of the pulses 247 has the effect of clamping the grid 250*a* of tube 250** to a fixed negative potential.

As an alternative in FIGURE 11 the negative pulse output from electronic switch trigger circuit 360 may be supplied to a control grid of picture tube 401 as indicated by line 402 in FIGURE 11. The pulses from trigger circuit 360 would have sufficient amplitude to blank out the cathode ray beam for the duration of the pulses regardless of any potential being supplied to the signal input of the tube 401, for example to the cathode thereof, during the audio transmission interval. If the pulses from trigger circuit 360 were of positive polarity they could be supplied to the cathode of picture tube 401 to blank out the picture during the audio transmission interval.

Each of the foregoing embodiments has been described with specific parameters related to the present standards in the United States for broadcast television. It will be apparent that the systems illustrated can be adapted to the standards of other countries and to other applications such as closed circuit television. Further, the principles of the present invention have application to signals other than audio and visual signals, for example to computer signals, analog control signals, and the like.

Although the description of this invention has been given with respect to particular embodiments, it is not to be construed in a limiting sense. Therefore, the foregoing description of this invention concerns only the preferred embodiments thereof, and accordingly changes and modifications may be made by those skilled in the art without departing from the spirit and scope of the novel concepts of this invention.

I claim as my invention:

1. A system for recording of audio and video intelligence on the same track on a record medium, comprising input means for coupling to a television receiver for receiving an audio intelligence signal having a predetermined carrier frequency and a video intelligence signal and for changing said audio signal to a modified audio intelligence signal having a different carrier frequency compatible with said video intelligence signal and nearly equal in frequency to the maximum frequency response of the record medium, and single track transducer head means connected to said input means for receiving both said video intelligence signal and said modified audio intelligence and constructed to record both said video intelligence signal and said modified audio intelligence signal on a single track of the record medium.

2. A system for electromagnetic recording and playback of audio and video intelligence on the same track on a record medium, comprising input means for coupling to a television receiver for supplying an original audio intelligence signal having a carrier of an original frequency and for supplying a video intelligence signal, oscillator means for supplying a fixed frequency signal, means for mixing the signal of said oscillator means with said original audio intelligence signal to provide a different audio signal having a substantially different audio carrier frequency, means for combining said video signal and said different audio signal to form a composite audio-video intelligence signal, electromagnetic transducer means for recording said composite audio-video signal on a record medium and for reproducing said signal therefrom, and means for coupling to said transducer means during playback and comprising a tuned circuit substantially tuned to said different audio carrier frequency for receiving the reproduced composite audio-video signal from said record medium during playback and for converting the reproduced audio signal to an audio signal having a carrier of said original frequency.

3. A playback system for a recorded composite audio-video signal comprising a record medium having a composite audio-video signal recorded thereon with the audio intelligence modulating a carrier frequency of the order of two megacycles per second, a playback head for scanning said record medium to electrically reproduce the recorded signal, frequency mixing means for converting said audio intelligence to a carrier of 4.5 megacycles per second, and means coupled to said head and responsive to said carrier frequency of the order of two megacycles per second and coupled to said frequency mixing means for delivering the audio intelligence reproduced by said head to said frequency mixing means to generate an audio intelligence signal for reproduction by a television receiver.

4. A television transducing arrangement for recorded audio and video intelligence on the same track of a record medium comprising a recording system having an upper band pass limit of the order of two megacycles per second and operative to record signals below said limit on a record medium, means for converting an input audio intelligence signal having a carrier of 4.5 megacycles per second to a modified audio intelligence signal having a carrier frequency of the order of 2 megacycles per second and equal to an odd multiple of 7,875 and less than the upper band pass limit of said recording system, and means for mixing said modified audio intelligence signal with a video signal having a line scanning rate of 15,750 cycles per second and supplying the resultant signal to said recording system for recording on a single track of the record medium.

5. A playback system comprising a record medium having a composite signal recorded thereon comprising a video intelligence component and a second signal component which modulates a carrier frequency corresponding to a recorded wavelength approaching the minimum wavelength which can be effectively recorded and reproduced from the record medium, a playback head for electrically reproducing the signal recorded on the record medium, and carrier frequency converting means connected to said head for converting the carrier frequency of the second signal component to a substantially higher frequency than that corresponding to said minimum wavelength on the record medium.

6. A signal transducer arrangement comprising a recording system having an effective pass band with a predetermined upper frequency limit and operative to effectively record signal components up to said upper frequency limit on a record medium, means for converting the frequency of a carrier of an intelligence signal from a relatively higher frequency above said upper frequency limit to a relatively lower frequency near but less than said upper frequency limit of the recording system, means for mixing the intelligence signal with a relatively wide band signal to provide a composite signal and for supplying said composite signal to said recording system for recording on the record medium.

7. A system for recording of audio and video intelligence on the same track on a record medium, comprising:

input means for coupling to a television receiver for receiving an audio intelligence signal having a predetermined carrier frequency and a video intelligence signal, recording means for recording electrical signals on a record medium with a predetermined maximum frequency response, and having a recording head unit for recording on a single track of the record medium, said input means comprising means for directly heterodyning said audio intelligence signal to a modified audio intelligence signal having a different carrier frequency substantially less than said predetermined carrier frequency and within said predetermined maximum frequency response, and means connected to said input means for receiving both said video intelligence signal and said modified audio intelligence signal and for connecting the same to said recording head unit to record both said video intelligence signal and said modified audio intelligence signal on a single track of the record medium.

8. A transducer system for transducing audio and video intelligence on the same track of a record medium, comprising:

input means for coupling to a television receiver for receiving an audio intelligence signal having a predetermined carrier frequency of substantially 4.5 megahertz and a video intelligence signal, a signal transducer device for recording signals on a record medium and for reproducing recorded signals therefrom with a predetermined maximum frequency response substantially less than 4.5 megahertz, said input means comprising means for heterodyning said audio signal directly to a modified audio intelligence signal having a substantially reduced carrier frequency within said maximum frequency response for transmission to the transducer device during recording operation, and means connected to said input means for receiving both said video intelligence signal and said modified audio intelligence signal and for supplying the same to said magnetic transducer device for recording on the record medium.

9. The transducer system of claim 8 with means connected with said transducer device during playback operation for separating the modified audio intelligence signal as reproduced, from the video intelligence signal as reproduced, and for heterodyning said substantially reduced carrier frequency up to said predetermined carrier frequency of substantially 4.5 megahertz.

10. A playback system for a recorded audio-video signal comprising:

a record medium having an audio-video signal recorded thereon with the audio intelligence modulating a carrier frequency within the maximum frequency response of the system, a playback head for scanning said record medium to electrically reproduce the recorded signal, means for separating the audio intelligence as reproduced by the playback head from the video component as reproduced, and for heterodyning the reproduced carrier frequency directly to a substantially higher carrier frequency above the maximum frequency response of the system.

11. The playback system of claim 10 with the substantially higher carrier frequency being substantially 4.5 megahertz and being supplied to a television broadcast receiver for demodulation of the reproduced audio intelligence.

12. A playback system for a recorded composite audio-video signal having the audio intelligence in the form of pulse modulation occurring during the horizontal blanking intervals of the video intelligence which comprises a playback device for electrically reproducing the recorded composite audio-video signal, audio pulse separator means for separating the pulse modulation audio intelligence from the video portion of the reproduced signal, and pulse signal demodulator means coupled to said separator means for receiving said audio intelligence therefrom and for demodulating said audio intelligence to provide an audio frequency sound signal, said pulse modulation comprising pulses having the same polarity as the horizontal synchronizing pulses of the video intelligence and all having an amplitude greater than the horizontal synchronizing pulses, said audio pulse separator means comprising an amplitude selection circuit for transmitting portions of the reproduced signal exceeding said horizontal synchronizing pulses in amplitude.

13. A playback system for a recorded composite audio-video signal having the audio intelligence in the form of pulse modulation occurring during the horizontal blanking intervals of the video intelligence which comprises a playback device for electrically reproducing the recorded composite audio-video signal, audio pulse separator means for separating the pulse modulation audio intelligence from the video portion of the reproduced signal, and pulse signal demodulator means coupled to said separator means for receiving said audio intelligence therefrom and for demodulating said audio intelligence to provide an audio frequency sound signal, said pulse modulation comprising pulses having the opposite polarity from the horizontal synchronizing pulses of the video intelligence, and said audio pulse separator means comprising an electronic switch controlled in synchronism with the horizontal rate of the video intelligence and connecting said playback device with said pulse signal demodulator means momentarily during time intervals immediately adjacent the successive horizontal synchronizing pulse intervals of the video intelligence.

14. A signal transmission system comprising electronic switch means having first and second inputs and an output and operative to alternately connect said first input with said output and said second input with said output, means for connecting the first input with a source of composite video signals, means for connecting the second input to a source of an intelligence signal of audio frequency, and means for cyclically connecting the second input with the output during the horizontal blanking portions of the video signal but subsequent to the horizontal synchronizing pulses of the video signal to generate at the output of said electronic switch means a composite signal including both the video and audio input information.

15. A signal transmission system comprising electronic switch means having first and second inputs and an output and operative to alternately connect said first input with said output and said second input with said output, means for connecting the first input with a source of composite video signals, means for connecting the second input to a source of an intelligence signal of audio frequency, and means for cyclically connecting the second input with the output subsequent to the horizontal synchronizing pulses of the video signal to generate at the output of said electronic switch means a composite signal including both the video and audio input information.

16. A signal transmission system comprising electronic switch means having first and second inputs and an output and operative to alternately connect said first input with said output and said second input with said output, means for connecting the first input with a source of composite video signals, means for connecting the second input to a source of intelligence signal, and means for cyclically connecting the second input with the output to generate at the output of said electronic switch means a composite signal including both the video and audio input information.

17. A playback system comprising:

a record medium having a recorded audio-video signal thereon including a recorded video intelligence signal with successive recorded video intelligence lines and recorded horizontal synchronizing pulses occurring in the horizontal blanking intervals between successive video intelligence lines, and including a recorded audio intelligence signal in the form of recorded audio intelligence pulses occurring during said horizontal blanking intervals and modulated in accordance with audio intelligence, the recorded audio intelligence pulses having the same polarity as the recorded horizontal synchronizing pulses and being time coincident with and superimposed on the recorded horizontal synchronizing pulses.

18. A playback system comprising:

a record medium having a recorded audio-video signal thereon including a recorded video intelligence signal with successive recorded video intelligence lines and recorded horizontal synchronizing pulses occurring in the horizontal blanking intervals between successive video intelligence lines, and including a recorded audio intelligence signal in the form of a recorded audio intelligence pulses occurring during said horizontal blanking intervals and modulated in accordance with audio intelligence, the recorded audio intelligence pulses having the same polarity as the recorded horizontal synchronizing pulses and being time coincident with and superimposed on the recorded horizontal synchronizing pulses and being modulated in amplitude in accordance with the audio intelligence.

19. A playback system comprising:

a record medium having a recorded audio-video signal thereon including a recorded video intelligence signal with successive recorded video intelligence lines and recorded horizontal synchronizing pulses occurring in the horizontal blanking intervals between successive video intelligence lines, and including a recorded audio intelligence signal in the form of recorded audio intelligence pulses occurring during said horizontal blanking intervals and modulated in accordance with audio intelligence, the recorded audio intelligence pulses having the same polarity as the recorded horizontal synchronizing pulses and occurring after the trailing edge of the synchronizing pulses, a playback device for scanning the record medium to electrically reproduce the audio-video signal, and supplying reproduced electrical audio intelligence pulses modulated in accordance with the audio intelligence and having a repetition rate of substantially 15,750 hertz, and means connected with said playback device for separating the reproduced electrical audio intelligence pulses and for demodulating the same to provide an electrical audio intelligence signal in accordance with said audio intelligence, and for supplying an electrical video intelligence signal in accordance with said recorded video intelligence signal.

20. A playback system comprising:
a record medium having a recorded audio-video signal thereon including a recorded video intelligence signal with successive recorded video intelligence lines and recorded horizontal synchronizing pulses occurring in the horizontal blanking intervals between successive video intelligence liness, and including a recorded audio intelligence signal in the form of recorded audio intelligence pulses occurring during said horizontal blanking intervals and modulated in accordance with audio intelligence,
said recorded audio-video intelligence including recorded vertical blanking pulses and recorded equalizing pulses occurring in vertical blanking intervals between successive recorded fields of the video intelligence lines,
said recorded audio intelligence pulses occurring during the vertical blanking intervals, and being offset in time from said equalizing pulses and being superimposed on said vertical blanking pulses,
a playback device for scanning the record medium to electrically reproduce the audio-video signal, and supplying reproduced electrical audio intelligence pulses modulated in accordance with the audio intelligence and having a repetition rate of substantially 15,750 hertz, and
means connected with said playback device for separating the reproduced electrical audio intelligence pulses and for demodulating the same to provide an electrical audio intelligence signal in accordance with said audio intelligence, and for supplying an electrical video intelligence signal in accordance with said recorded video intelligence signal.

21. A playback system comprising:
a record medium having a recorded audio-video signal thereon including a recorded video intelligence signal with successive recorded video intelligence lines and recorded horizontal synchronizing pulses occurring in the horizontal blanking intervals between successive video intelligence lines, and including a recorded audio intelligence signal in the form of recorded audio intelligence pulses occurring during said horizontal blanking intervals and modulated in accordance with audio intelligence,
said recorded audio-video intelligence including recorded vertical blanking pulses and recorded equalizing pulses occurring in vertical blanking intervals between successive recorded fields of the video intelligence lines,
said recorded audio intelligence pulses occurring during the vertical blanking intervals, and being offset in time from said equalizing pulses and being superimposed on said vertical blanking pulses,
a playback device for scanning the record medium to electrically reproduce the audio-video signal, and supplying reproduced electrical audio intelligence pulses modulated in accordance with the audio intelligence and having a repetition rate of substantially 15,750 hertz, and
means connected with said playback device for separating the reproduced electrical audio intelligence pulses and for demodulating the same to provide an electrical audio intelligence signal in accordance with said audio intelligence, and for supplying an electrical video intelligence signal in accordance with said recorded video intelligence signal,
said means connected with said playback device comprising means for transmitting the reproduced audio-video signal and for cyclically clamping said signal at a rate of substantially 15,750 hertz and at regions of the vertical blanking pulses so as to tend to inhibit modulation of the height of the reproduced audio intelligence pulses by the vertical blanking pulses.

22. A playback system comprising:
a record medium having a recorded audio-video signal thereon including a recorded video intelligence signal with successive recorded video intelligence lines and recorded horizontal synchronizing pulses occurring in the horizontal blanking intervals between successive video intelligence lines, and including a recorded audio intelligence signal in the form of recorded audio intelligence pulses occurring during said horizontal blanking intervals and modulated in accordance with audio intelligence.
said recorded audio-video intelligence including recorded vertical blanking pulses and recorded equalizing pulses occurring in vertical blanking intervals between successive recorded fields of the video intelligence lines,
said recorded audio intelligence pulses occurring during the vertical blanking intervals, and being offset in time from said equalizing pulses and being superimposed on said vertical blanking pulses,
a playback device for scanning the record medium to electrically reproduce the audio-video signal, and supplying reproduced electrical audio intelligence pulses modulated in accordance with the audio intelligence and having a repetition rate of substantially 15,750 hertz, and
means connected with said playback device for separating the reproduced electrical audio intelligence pulses and for demodulating the same to provide an electrical audio intelligence signal in accordance with said audio intelligence, and for supplying an electrical video intelligence signal in accordance with said recorded video intelligence signal,
said means for separating the reproduced audio intelligence pulses comprising amplitude selection means for eliminating any amplitude modulation of the reproduced audio intelligence pulses by the vertical blanking pulses.

23. A playback system comprising:
a record medium having a recorded audio-video signal thereon including a recorded video intelligence signal with successive recorded picture portions occupying a portion only of successive horizontal picture intervals, the horizontal picture intervals having a time duration of substantially 53.5 microseconds as reproduced and alternating with horizontal blanking intervals having a time duration of substantially ten microseconds as reproduced,
said recorded audio-video signal further including a recorded audio intelligence signal interspersed with the successive recorded picture portions and modulated in accordance with audio intelligence,
said recorded audio intelligence signal extending into said horizontal picture intervals having said time duration of substantially 53.5 microseconds as reproduced and not being confined to the horizontal blanking intervals between the successive horizontal picture intervals, and
playback means scanning said record medium and electrically reproducing the recorded audio-video signal to provide electrically reproduced picture portions having a time duration of substantially less than 53.5 microseconds and to provide a reproduced electrical audio intelligence signal which extends into the horizontal picture intervals and is not confined to the horizontal blanking intervals of the reproduced audio-video signal.

24. A playback system comprising:
a record medium having a recorded audio-video signal thereon including a recorded video intelligence signal with successive recorded picture portions, and successive recorded horizontal synchronizing pulses occurring between successive recorded picture portions, said recorded audio-video signal further including recorded vertical blanking pulses and recorded equalizing pulses occurring at field rate intervals, and including a recorded audio intelligence signal interspersed with the successive recorded picture portions but superimposed on the successive recorded vertical blanking pulses and modulated in accordance with audio intelligence, and playback means for scanning the record medium to produce an electrical audio-video signal in accordance with the recorded audio-video signal and including reproduced electrical picture portions recurring at a rate of substantially 15,750 hertz and including reproduced electrical vertical blanking pulses occurring at a repetition rate of the order of 60 hertz, and means connected with said playback means for separating the reproduced electrical audio intelligence signal and for demodulating the same to provide an audio signal in accordance with the recorded audio intelligence.

25. A playback system comprising:

a record medium with a recorded audio-video signal thereon including a recorded video intelligence signal having successive recorded video intelligence lines and intervening horizontal blanking intervals between successive video intelligence lines, and including a recorded audio intelligence signal in the form of recorded audio intelligence pulses occurring during said horizontal blanking intervals and modulated in accordance with audio intelligence, a playback device for scanning the record medium to electrically reproduce the audio-video signal, and supplying reproduced electrical audio intelligence pulses modulated in accordance with the audio intelligence and having a repetition rate of substantially 15,750 hertz, means connected with said playback device for separating the reproduced electrical audio intelligence pulses and for demodulating the same to provide an electrical audio intelligence signal in accordance with said audio intelligence, and for supplying an electrical video intelligence signal in accordance with said recorded video intelligence signal, and an image reproducing device responsive to said electrical video intelligence signal for producing a visual image, and means for supplying a blanking pulse to said image reproducing device during the time of occurrence of said reproduced electrical audio intelligence pulses to prevent inadvertent display thereof by said image reproducing device.

26. A playback system comprising:

a record medium having a recorded audio-video signal thereon including a recorded video intelligence signal with successive recorded video intelligence lines and horizontal blanking intervals between successive video intelligence lines, and including a recorded audio intelligence signal in the form of recorded audio intelligence pulses occurring during said horizontal blanking intervals and modulated in accordance with audio intelligenc,e said recorded audio intelligence pulses having the same polarity as the recorded video intelligence lines, a playback device for scanning the record medium to electrically reproduce the audio-video signal, and supplying reproduced electrical audio intelligence pulses modulated in accordance with the audio intelligence and having a repetition rate of substantially 15,750 hertz, means connected with said playback device for separating the reproduced electrical audio intelligence pulses and for demodulating the same to provide an electrical audio intelligence signal in accordance with said audio intelligence, and for supplying an electrical video intelligence signal in accordance with said recorded video intelligence signal, and an image reproducing device responsive to said electrical video intelligence signal for producing a visual image, and means for supplying a blanking pulse to said image reproducing device during the time of occurrence of said reproduced electrical audio intelligence pulses to prevent inadvertent display thereof by said image reproducing device.

27. A playback system comprising:

a record medium having a recorded audio-video signal on a single channel thereof including a recorded video intelligence signal with successive recorded picture portions occupying a portion only of successive horizontal picture intervals, and alternating with horizontal blanking intervals, said recorded audio-video signal further including a recorded audio intelligence signal interspersed with the successive recorded picture portions and modulated in accordance with audio intelligence, said recorded audio intelligence signal extending into said horizontal picture intervals and not being confined to the horizontal blanking intervals between the successive horizontal picture intervals, and playback means scanning said record medium and electrically reproducing the recorded audio-video signal to provide electrically reproduced picture portions having a time duration of substantially less than said horizontal picture intervals and to provide a reproduced electrical audio intelligence signal which extends into the horizontal picture intervals of the reproduced audio-video signal, picture reproducing circuits coupled with said playback means to receive the electrically reproduced picture portions and to display an image in accordance therewith, and means for supplying blanking pulses to said pictures reproducing circuits during the intervals of occurrence of the reproduced electrical audio intelligence signal.

References Cited

UNITED STATES PATENTS

| | | | |
|---|---|---|---|
| 3,371,156 | 2/1968 | Frohbach | 178—5.6 |
| 2,550,821 | 5/1951 | Kharbanda | 178—5.6 |
| 2,624,797 | 1/1953 | Lawson | 178—5.6 |
| 2,909,596 | 10/1959 | Fay. | |
| 3,184,537 | 5/1965 | Court | 178—5.1 |
| 3,231,818 | 1/1966 | Court | 178—5.1 |

ROBERT L. GRIFFIN, Primary Examiner

H. W. BRITTON, Assistant Examiner

U.S. Cl. X.R.

178—5.6; 179—100.2